(12) United States Patent
Suzuki et al.

(10) Patent No.: US 11,360,439 B2
(45) Date of Patent: Jun. 14, 2022

(54) ELECTRONIC DEVICE, INFORMATION PROCESSING METHOD, AND NON-TRANSITORY COMPUTER-READABLE RECORDING MEDIUM

(71) Applicant: CASIO COMPUTER CO., LTD., Tokyo (JP)

(72) Inventors: Karen Suzuki, Musahino (JP); Keiichi Imamura, Hamura (JP); Naotaka Hikosaka, Fussa (JP); Tadahiro Takeguchi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 170 days.

(21) Appl. No.: 16/596,599

(22) Filed: Oct. 8, 2019

(65) Prior Publication Data

US 2020/0110371 A1    Apr. 9, 2020

(30) Foreign Application Priority Data

Oct. 9, 2018  (JP) .............................. JP2018-190973

(51) Int. Cl.
| | | |
|---|---|---|
| *G04G 21/02* | (2010.01) | |
| *G06F 9/30* | (2018.01) | |
| *G06F 1/3231* | (2019.01) | |
| *G01C 22/00* | (2006.01) | |
| *G06F 3/14* | (2006.01) | |

(Continued)

(52) U.S. Cl.
CPC ......... *G04G 21/025* (2013.01); *G01C 22/006* (2013.01); *G06F 1/3203* (2013.01);
(Continued)

(58) Field of Classification Search
CPC ...... G04G 21/025; G04G 21/04; G04G 21/02; G06F 9/3001; G06F 1/3231; G06F 1/163;
(Continued)

(56) References Cited

U.S. PATENT DOCUMENTS

| 10,706,491 B2 * | 7/2020 | Mizuno ................. G06F 3/1438 |
|---|---|---|
| 2007/0061560 A1 * | 3/2007 | Oshima ................ G06F 1/3203 |
| | | 713/1 |

(Continued)

FOREIGN PATENT DOCUMENTS

| JP | 2003260043 A | 9/2003 |
|---|---|---|
| JP | 2008201554 A | 9/2008 |

(Continued)

*Primary Examiner* — Douglas Kay
(74) *Attorney, Agent, or Firm* — Holtz, Holtz & Volek PC

(57) ABSTRACT

An electronic device includes a sensor unit, a first CPU, and a second CPU. A first management unit functioning in the first CPU manages first information related to cumulative information acquired by the sensor unit. A second management unit functioning in the second CPU manages second information related to the cumulative information. One of the first management unit and the second management unit outputs a corresponding one of the first and second information related to the cumulative information managed by the one management unit to the other management unit according to switching of an operating state of the first CPU, and the other management unit continues management of the corresponding other of the first and second information related to the cumulative information based on the corresponding one of the first and second information related to the cumulative information output from the one management unit.

17 Claims, 10 Drawing Sheets

(51) Int. Cl.
  *G06F 9/54* (2006.01)
  *H04L 1/22* (2006.01)
  *G06F 1/3203* (2019.01)

(52) U.S. Cl.
  CPC .............. *G06F 1/3231* (2013.01); *G06F 3/14* (2013.01); *G06F 9/3001* (2013.01); *G06F 9/54* (2013.01); *H04L 1/22* (2013.01)

(58) Field of Classification Search
  CPC .... G06F 1/3215; G06F 1/3265; G06F 1/3287; G06F 1/3293; G06F 9/30007; G01C 22/006; Y02D 10/00
  See application file for complete search history.

(56) References Cited

U.S. PATENT DOCUMENTS

| | | | |
|---|---|---|---|
| 2012/0308228 A1* | 12/2012 | Tanaka | H04Q 11/0067 398/25 |
| 2014/0094198 A1* | 4/2014 | Heo | H04W 52/0274 455/456.4 |
| 2014/0143573 A1* | 5/2014 | Ishihara | G06F 1/3293 713/323 |
| 2015/0066424 A1* | 3/2015 | Bae | G06F 1/3293 702/150 |
| 2016/0063664 A1* | 3/2016 | Mizuno | G06T 1/20 345/502 |
| 2016/0124355 A1* | 5/2016 | Nishikawa | G03G 15/1675 399/66 |
| 2016/0379547 A1* | 12/2016 | Okada | G09G 5/14 345/428 |
| 2017/0177067 A1 | 6/2017 | Okada et al. | |
| 2017/0244827 A1* | 8/2017 | Kang | G06F 1/3231 |

FOREIGN PATENT DOCUMENTS

| | | | | |
|---|---|---|---|---|
| JP | 2014183328 A | | 9/2014 | |
| JP | 2017117121 A | | 6/2017 | |
| JP | 2018180683 A | * | 11/2018 | .............. H04M 1/00 |

* cited by examiner

ELECTRONIC DEVICE, INFORMATION PROCESSING METHOD, AND NON-TRANSITORY COMPUTER-READABLE RECORDING MEDIUM

CROSS-REFERENCE TO RELATED APPLICATIONS

This application is based on and claims the benefit of priority from Japanese Patent Application No. 2018-190973, filed on Oct. 9, 2018, the entire contents of which are incorporated herein by reference.

BACKGROUND

1. Technical Field

This technical field relates to an electronic device, an information processing method, and a non-transitory computer-readable recording medium storing an information processing program.

2. Related Art

In the related art, an electronic device including a plurality of arithmetic processing units is known. As disclosed in JP 2017-117121 A, in such an electronic device, each of the plurality of arithmetic processing units appropriately controls the electronic device by performing a process assigned according to characteristics of each arithmetic processing unit. It is possible to reduce power consumption by setting an operating state of a part of the arithmetic processing units to be in a stop state (for example, shutdown state) depending on the usage status.

However, in the configuration of JP 2017-117121 A, there are some cases where information is not able to be properly managed when the operating state of a part of the arithmetic processing units is switched. For example, when the operating state of one arithmetic processing unit that manages first information based on an output of a sensor is in a stop state, there are some cases where the first information based on the output of the sensor is incorrect because of failing to appropriately cooperate with the other arithmetic processing unit.

SUMMARY

One embodiment discloses an electronic device, an information processing method, and a non-transitory computer-readable recording medium storing an information processing program.

According to an embodiment, there is provided an electronic device including a sensor, a first processor that manages first information based on an output of the sensor, and a second processor that manages second information based on the output of the sensor. One processor of the first processor and the second processor outputs the corresponding one of the first information and the second information managed by the one processor to the other processor according to switching of an operating state of the first processor, and the other processor continues management of the corresponding other of the first information and second information based on the output of the sensor and based on the corresponding one of the first information and the second information output from the one processor.

DETAILED DESCRIPTION

Hereinafter, an embodiment will be described with reference to the drawings.

Figure 1:
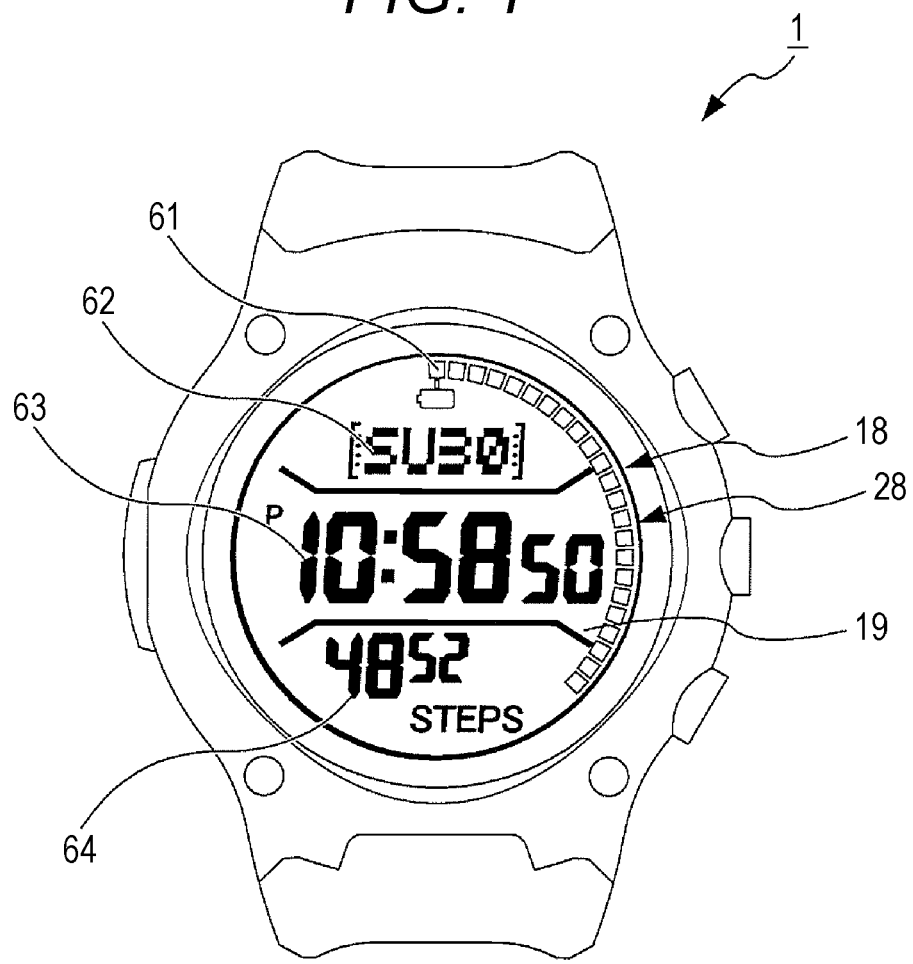
FIG. 1 is a schematic diagram of an electronic device according to an embodiment.

FIG. 1 is a diagram illustrating an external configuration of an electronic device 1 according to the embodiment.

As illustrated in FIG. 1, the electronic device 1 of the present embodiment is a wristwatch type device (for example, smartwatch). The electronic device 1 includes a first display 18 and a second display 28 (will be described in detail below), and the second display 28 is stacked on the first display 18. The second display 28 is a transmissive display, and can perform transmissive display or semi-transmissive display such that a display region of the first display 18 is visible. A touch panel 19 is provided on the second display 28.

With such a configuration, the electronic device 1 can perform display such that the display of the second display 8 is superimposed on the display of the first display 18. Since the electronic device 1 has the touch panel 19, a touch operation can be performed on a display content.

Here, for example, a state in which a timepiece that includes a battery remaining quantity ring 61, a date 62, a time 63, and a step number 64 is displayed on the first display 18 is illustrated. This display is realized by a display using the first display 18, a display using the second display 28, or a display obtained by superimposing both displays.

The battery remaining quantity ring 61 is a display illustrating a ring indicating a remaining quantity of a battery. The longer the ring that is displayed, the more the remaining quantity of the battery remains. The date 62 is a display illustrating a date and the day of the week. The time 63 is a display illustrating a current time. The step number 64 is a display illustrating a value of the number of steps measured by the electronic device 1. Here, the number of steps is calculated on the basis of, for example, sensing using an acceleration sensor.

In the present embodiment, as an example of description, the number of steps is used as cumulative information. Here, the cumulative information is information cumulated according to a usage status of a user. However, the number of steps is merely an example of the cumulative information, and other information may be used as the cumulative information. For example, a heart rate or calorie consumption cumulated according to the usage state of the user who uses the electronic device 1 may be used as the cumulative information.

In the configuration as illustrated in FIG. 1, the electronic device 1 performs a cumulative value management process. Here, the cumulative value management process is a series of processes for appropriately managing a cumulative value of the cumulative information even when operating states of a plurality of arithmetic processing units included in the electronic device 1 are switched.

In the electronic device 1, the operating state of the electronic device 1 is switched between a state in which a main function is activating (hereinafter, referred to as a "main function activation state") and which the main function is stopped (hereinafter, referred to as a "main function stop state") depending on the usage status of the user.

As stated above, the electronic device 1 reduces a power supposed to be consumed by the main function by entering the main function stop state depending on the usage status of the user. That is, the electronic device 1 can reduce power consumption while ensuring convenience of the user.

Meanwhile, in order to appropriately manage the cumulative value of the cumulative information, the electronic device 1 includes a first management unit and a second management unit so as to correspond to the plurality of arithmetic processing units. At the time of switching the operating state, the first management unit and the second management unit output the cumulative information managed by one management unit to the other management unit. The other management unit continues to manage the cumulative information by setting the cumulative information output from one management unit to a correction value to be used for correcting the cumulative value of the cumulative information.

As stated above, since each management unit outputs (in other words, takes over) the cumulative information to the other management unit at the time of switching the operating state, the electronic device 1 including the plurality of arithmetic processing units can appropriately manage the cumulative information.

Figure 2:
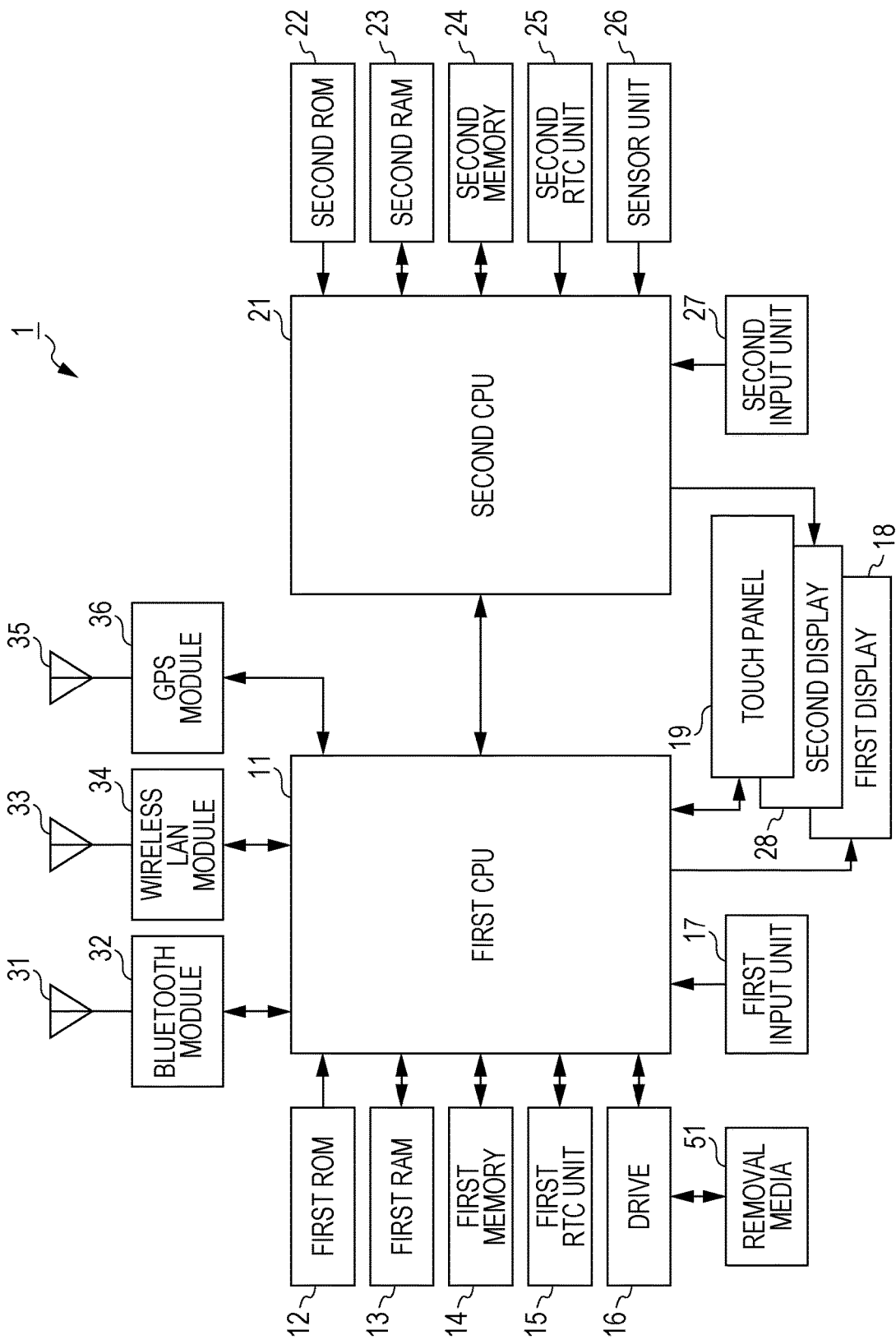
FIG. 2 is a block diagram illustrating a hardware configuration of the electronic device.

FIG. 2 is a block diagram illustrating a hardware configuration of the electronic device 1.

As illustrated in FIG. 2, the electronic device 1 includes a first central processing unit (CPU) 11, a first read only memory (ROM) 12, a first random access memory (RAM) 13, a first memory 14, a first real time clock (RTC) unit 15, a drive 16, a first input unit 17, a first display 18, a touch panel 19, a second CPU 21, a second ROM 22, a second RAM 23, a second memory 24, a second RTC unit 25, a sensor unit 26, a second input unit 27, a second display 28, a Bluetooth (registered trademark) antenna 31, a Bluetooth module 32, and a wireless local area network (LAN) antenna 33, a wireless LAN module 34, a GPS antenna 35, and a Global Positioning System (GPS) module 42.

The electronic device 1 functions under the control of the first CPU 11 and the second CPU 21. Here, in the main function activation state described above, the first CPU 11 and the second CPU 21 mainly function. Meanwhile, in the main function stop state described above, the first CPU 11 is in a stop state (for example, shutdown state), while the second CPU 21 functions.

In the main function activation state, the first CPU 11 performs various arithmetic processes on the basis of an operating system (OS) and various programs executed under the management of the OS. The first CPU 11 realizes a function of displaying a timepiece of the electronic device 1 and a function similar to a smartphone by implementing various functions based on results of the arithmetic processes. For example, the first CPU 11 displays an incoming e-mail or a message regarding weather information received via the Bluetooth module 32 or the wireless LAN module 34 on the first display 18.

In the main function activation state, the first CPU 11 performs, as a part of the cumulative value management process, a process for managing, as the cumulative value of the cumulative information, a first cumulative value of the cumulative information, a process for managing a first correction value for correcting the first cumulative value of the cumulative information, or a process for displaying the first cumulative value of the cumulative information on the first display 18. This cumulative value management process is performed by the first CPU 11 and the second CPU 21 in cooperation with each other.

In addition, the first CPU 11 recognizes sound input via the first input unit 17, or performs processes related to various functions implemented as functions similar to a smartphone. In the main function activation state, the first CPU 11 calculates a time with a time signal input from the first RTC unit 15 as a reference or displays the time, the day of the week, and the date on the first display 18. In this case, the first CPU 11 may correct a time based on time information included in GPS positioning information acquired from the GPS module 36 in the calculation of the time. The first CPU 11 realizes the various processes described above on the basis of, for example, a general-purpose OS such as Android (registered trademark).

Meanwhile, the first CPU 11 stops the operation in the main function stop state, and does not perform the above-described various processes.

The second CPU 21 performs various arithmetic processes on the basis of a specific program such as an embedded program in the main function activation state and the main function stop state, and executes processes based on the results of the arithmetic processes. Accordingly, the second CPU 21 issues a display command for the second display 28, acquires detection results of various sensors, or performs processes related to various functions implemented as functions of the wristwatch.

The second CPU 21 performs, as a part of the cumulative value management process, a process for managing, as the cumulative value of the cumulative information, a second cumulative value of the cumulative information, or a process for managing a second correction value for correcting the second cumulative value of the cumulative information in the main function activation state and the main function stop state. The second CPU 21 performs processing for displaying the second cumulative value of the cumulative information on the second display 28 in the main function stop state. This cumulative value management process is performed by the first CPU 11 and the second CPU 21 while appropriately cooperating with each other. The first CPU 11 controls the first display 18, and the second CPU 21 controls the second display 28.

The second CPU 21 calculates a time based on a time signal input from the second RTC unit 25, and displays the time, the day of the week, and the date on the second display 28. The second CPU 21 notifies the first CPU 11 of the calculated time, the day of the week, and the date.

The process of the specific program executed by the second CPU 21 (for example, the calculation of the time) is simpler than the process of the OS executed by the first CPU 11, and can be consequently performed with a low processing load and low power consumption. Thus, hardware specifications required for the second CPU 21 may be lower than those of the first CPU 11.

Accordingly, when only the functions of the wristwatch or the function for managing the cumulative value are required, the second CPU 21 is operated and the first CPU 11 is in the stop state (or a so-called sleep state in which most other functions are stopped by leaving only some functions), and thus, it is possible to reduce the power consumption of the entire electronic device 1. In this case, the first display 18, the touch panel 19, and the GPS module 36 are also in the stop state (or the so-called sleep state in which most other functions are stopped by leaving only some functions), and thus, it is possible to further reduce the power consumption of the entire electronic device 1.

As stated above, the electronic device 1 reduces the power supposed to be consumed by the main function by entering the main function stop state depending on the situation. Accordingly, the electronic device 1 can reduce the power consumption while ensuring the convenience of the user. Since the electronic device 1 is operated for a long time by a battery (not illustrated) built in the electronic device 1 by reducing the power consumption, it is possible to lengthen an operating time of the electronic device 1.

The first ROM 12 from which data can be read out by the first CPU 11 stores various programs executed by the first CPU 11 and initial setting data. For example, the first ROM 12 stores the OS program executed by the first CPU 11, various programs executed under the management of the OS, and the program for the function for performing the cumulative value management process.

The first RAM 13 from which data can read out and written by the first CPU 11 provides a work memory space to the first CPU 11, and stores temporary work data. For example, the first RAM 13 provides a system area and a work area when the first CPU 11 executes the OS.

The first memory 14 is a non-volatile memory from which data can be read out and written by the first CPU 11, and is, for example, a flash memory or an electrically erasable and programmable read only memory (EEPROM).

The first memory 14 stores various data (such as data of various setting contents) generated by various functions similar to the smartphone achieved under the control by the first CPU 11.

The first RTC unit 15 measures a time, and outputs a time signal indicating the measured time to the first CPU 11.

The removable medium 51 which is a magnetic disk, an optical disk, a magneto-optical disk, or a semiconductor memory is appropriately attached to the drive 16. The removable medium 51 from which data can be read out and written by the first CPU 11 can store various data such as data detected by various sensors.

The first input unit 17 includes various buttons, and inputs various information according to a user command operation. The first input unit 17 further includes a microphone that converts sound into an electrical signal, and outputs a signal indicating the input sound (such as a sound command for operation) to the first CPU 11.

The first display 18 is constituted by an organic electroluminescence display (OLED), and displays various information on a display screen under the control of the first CPU 11.

The touch panel 19 is a capacitive type or resistive type touch panel provided on a display screen of the second display 28. The touch panel 19 detects a touch operation position and an operation content of the user on the operation surface, generates a signal corresponding to the operation, and outputs, as an input signal, the signal to the first CPU 11.

The Bluetooth antenna 31 is an antenna that transmits and receives electromagnetic waves based on the Bluetooth standard, and is, for example, a monopole antenna. The Bluetooth antenna 31 transmits, as an electromagnetic wave, an electrical signal for wireless communication input from the Bluetooth module 32, or converts the received electromagnetic wave into an electrical signal and outputs the electrical signal to the Bluetooth module 32.

The Bluetooth module 32 transmits a signal to another device via the Bluetooth antenna 31 according to a command of the first CPU 11. The Bluetooth module 32 receives a signal transmitted from another device, and outputs information indicated by the received signal to the first CPU 11.

The wireless LAN antenna 33 is an antenna capable of receiving radio waves having a frequency corresponding to the wireless communication to be used by the wireless LAN module 34, and is, for example, a loop antenna or a rod antenna. The wireless LAN antenna 33 transmits, as the electromagnetic wave, the electrical signal for the wireless communication input from the wireless LAN module 34, or converts the received electromagnetic wave into an electrical signal and outputs the electrical signal to the wireless LAN module 34.

The wireless LAN module 34 transmits a signal to another device via the wireless LAN antenna 33 according to a command of the first CPU 11. The wireless LAN module 34 receives a signal transmitted from another device, and outputs information indicated by the received signal to the first CPU 11.

The GPS antenna 35 receives a radio wave transmitted from a satellite in GPS, converts the received radio wave into an electrical signal, and outputs the converted electrical signal to the GPS module 36.

The GPS module 36 detects a current position (for example, a current position specified by latitude, longitude, and altitude) of the electronic device 1 indicated by the GPS and a current time indicated by the GPS on the basis of the electrical signal input from the GPS antenna 35. Hereinafter, information including the current position of the electronic device 1 and the current time indicated by the GPS is referred to as "GPS positioning information". The GPS module 36 outputs the detected GPS positioning information to the first CPU 11.

The second ROM 22 from which data can be read out by the second CPU 21 stores a specific program executed by the second CPU 21 and initial setting data. For example, the second ROM 22 stores an embedded program to achieve the functions of the wristwatch and the program to achieve the function of performing the cumulative value management process.

The second RAM 23 from which data can be read out and written by the second CPU 21 provides a work memory space to the second CPU 21, and stores temporary work data. For example, the second RAM 23 provides a storage region when the second CPU 21 executes the embedded program.

The second memory 24 is a non-volatile memory from which data can be read out and written by the second CPU 21, and is, for example, a flash memory or an EEPROM. The second memory 24 stores various data (such as data of various setting contents) generated in the functions of the wristwatch.

The second RTC unit 25 measures a time, and outputs a time signal indicating the measured time to the second CPU 21.

The sensor unit 26 is a set of a plurality of sensors that measures various information. The sensor unit 26 includes, for example, a pulse sensor, a geomagnetic sensor, an acceleration sensor, a gyro sensor, and an illuminance sensor.

The pulse sensor is provided on a rear side (side facing the arm of the user) of the electronic device 1, detects a pulse of the user wearing the electronic device 1, and outputs information indicating the detected pulse to the second CPU 21.

The geomagnetic sensor detects a geomagnetism direction, and outputs information indicating the detected geomagnetism direction to the second CPU 21.

The acceleration sensor detects an acceleration in three-axis directions in the electronic device 1, and outputs information indicating the detected acceleration to the second CPU 21.

The gyro sensor detects angular velocities in the three-axis directions in the electronic device 1, and outputs information indicating the detected angular velocities to the second CPU 21.

For example, the illuminance sensor is provided at a predetermined location on a rear side of the first display 18 or a predetermined location on a bezel portion of the electronic device 1, detects brightness (illuminance) in the display region of the electronic device 1, and outputs information indicating the brightness to the second CPU 21.

The second CPU 21 outputs information detected by these various sensors to the first CPU 11 as necessary. For example, the first CPU 11 uses information detected by these various sensors by the functions similar to the smartphone. For example, the first CPU 11 adjusts the luminance of the display screen of the first display 18 on the basis of the brightness detected by the illuminance sensor.

The second input unit 27 includes various buttons, and inputs various information according to the command operation of the user.

The second display 28 is a polymer network (PN) liquid crystal display capable of transmitting light in whole or part, and displays various information on the display screen under the control of the second CPU 21.

A positional relationship between the second display 28 and the first display 18 will be described with reference to FIGS. 3A and 3B.

Figure 3A:
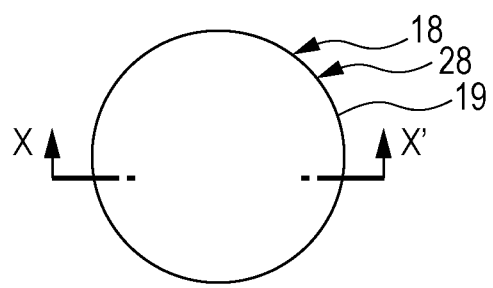
FIG. 3A is a schematic diagram illustrating a display region of the electronic device.

FIG. 3A is a schematic diagram illustrating a form in which the illuminance sensor 29 is displayed in the display region of the electronic device 1. FIG. 3B is a schematic diagram illustrating a cross section taken along a line X-X' in FIG. 3A.

As illustrated in FIG. 3A, the display region of the first display 18 and the display region of the second display 28 are arranged so as to be superimposed on each other.

Figure 3B:
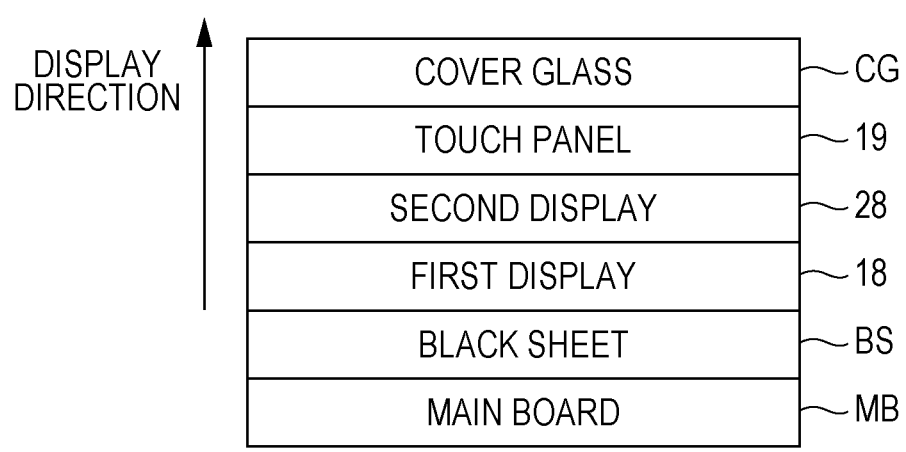
FIG. 3B is a schematic diagram illustrating a cross section taken along a line X-X' in FIG. 3A.

As illustrated in FIG. 3B, the electronic device 1 has a structure in which the cover glass CG, the touch panel 19, the second display 28, the first display 18, the black sheet BS, and the main board MB are stacked in this order from the front side. Among these, the black sheet BS is a member that adjusts color when viewed through the second display 28 and the first display 18, and black is viewed in the present embodiment. The pieces of hardware described with reference to FIG. 2 are arranged on the main board MB, and signal lines for connecting the pieces of hardware are arranged.

In the present embodiment, the PN liquid crystal display which is the second display 28 is stacked on the display screen of the organic EL display which is the first display 18, as illustrated in FIG. 3B. Liquid crystal molecules are irregularly arranged at a portion of this PN liquid crystal display to which no electric potential is applied, and light is reflected from this portion. That is, a display using the PN liquid crystal display is performed at the portion to which no electrical potential is applied.

Meanwhile, since the liquid crystal molecules are aligned so as to be perpendicular to the display screen at a portion to which a potential is applied, light can be transmitted through this portion. That is, a display using the organic EL display can be viewed through the PN liquid crystal display at the portion to which the potential is applied. That is, the electronic device 1 can perform display in a state in which the display using the second display 28 is superimposed on the display using the first display 18.

As illustrated in FIG. 3B, the display direction of the first display 18 and the second display 28 is a direction from each display toward the cover glass CG. This corresponds to the direction from a rear surface of a paper surface to the front surface in FIG. 3A.

Next, a functional configuration of the electronic device 1 will be described.

Figure 4:
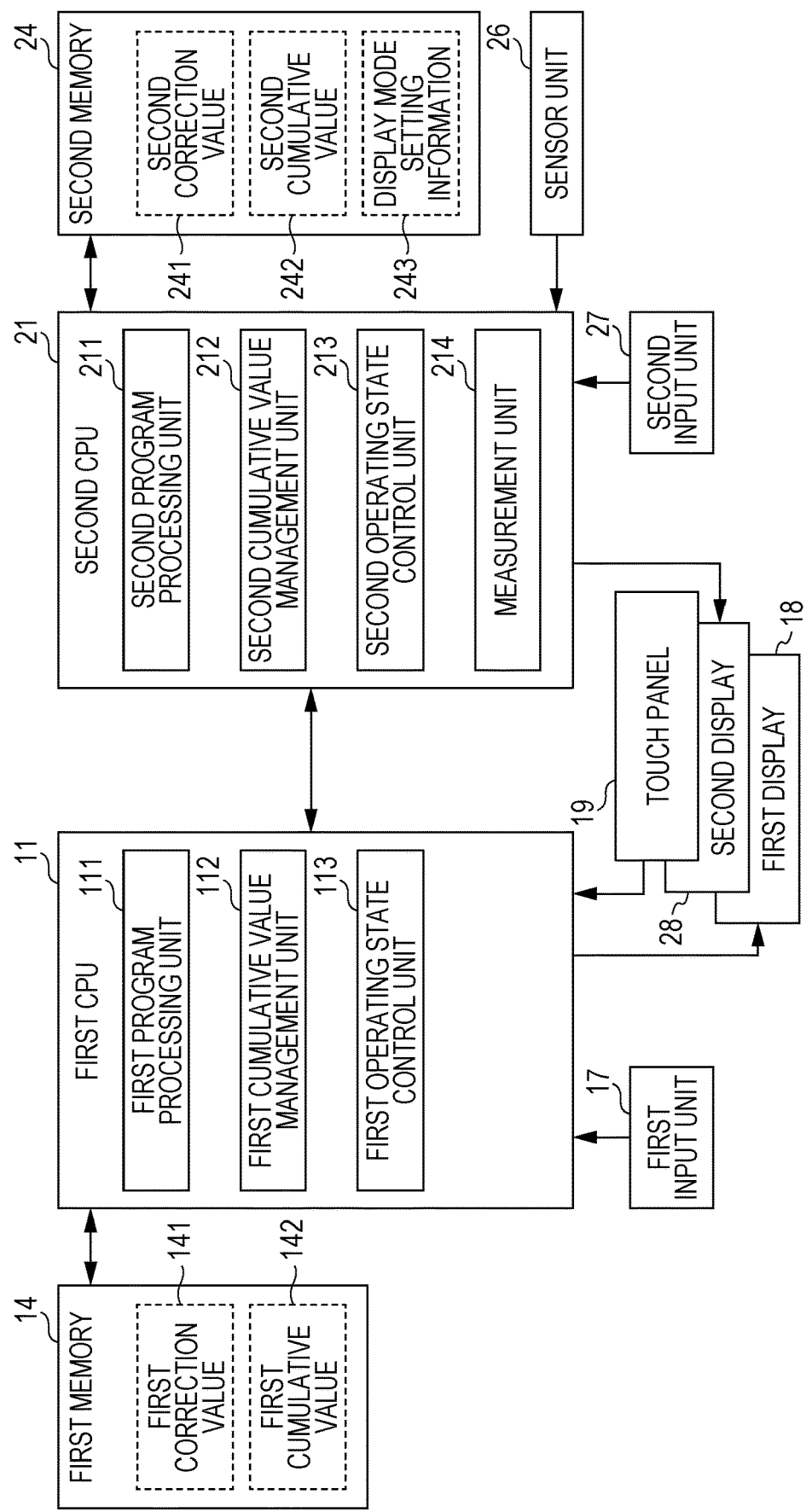
FIG. 4 is a functional block diagram illustrating a functional configuration for performing a cumulative value management process among functional configurations of the electronic device of FIG. 2.

FIG. 4 is a functional block diagram illustrating a functional configuration for performing the cumulative value management process among the functional configurations of the electronic device 1 of FIG. 2.

The cumulative value management process is a series of processes for appropriately managing the cumulative value of the cumulative information even when the operating states of the plurality of arithmetic processing units included in the electronic device 1 are switched.

When the cumulative value management process is performed, a first program processing unit 111, a first cumulative value management unit 112, and a first operating state control unit 113 function in the first CPU 11, as illustrated in FIG. 4.

When the cumulative value management process is performed, a second program processing unit 211, a second cumulative value management unit 212, a second operating state control unit 213, and a measurement unit 214 function in the second CPU 21, as illustrated in FIG. 4.

When the cumulative value management process is performed, a first correction value 141 and a first cumulative value 142 are stored in one region of the first memory 14.

When the cumulative value management process is performed, a second correction value 241, a second cumulative value 242, and display mode setting information 243 are stored in one region of the second memory 24.

Even when not specifically mentioned below, data necessary for performing the cumulative value management process is appropriately transmitted and received between these functional blocks at an appropriate timing.

The first program processing unit 111 performs the function for displaying the timepiece and the functions similar to the smartphone by performing various arithmetic processes based on a first program and controlling various hardware on the basis of the results of the arithmetic processes. The first program is the above-described general-purpose OS or other application programs. The first program processing unit 111 continues the operation in the main function activation state.

The first cumulative value management unit 112 manages information related to the cumulative information. That is, the first cumulative value management unit 112 manages the measurement value of the cumulative information measured by the measurement unit 214, the first correction value 141 for correcting the first cumulative value 142, and the first cumulative value 142 of the cumulative information calculated through this correction.

Here, the measurement value of the cumulative information is output from the measurement unit 214 to the first program processing unit 111 and the second cumulative value management unit 212 whenever the measurement value increases. The first correction value 141 and the first cumulative value 142 are stored in the first memory 14 as illustrated, and are appropriately updated to the latest values by the first cumulative value management unit 112.

The first cumulative value management unit 112 outputs the first cumulative value 142 to be managed to the first program processing unit 111. Application software which functions in the first program processing unit 111 and displays, as the current number of steps of the user, the timepieces displays the first cumulative value 142 input from the first cumulative value management unit 112 on the first display 18. Accordingly, the display of the step number 64 illustrated in FIG. 1 is achieved.

A method of managing the cumulative information, which is performed by the first operating state control unit 113 and the second operation state control unit 213 cooperating with each other, will be described below.

The first operating state control unit 113 switches the operating state of the electronic device 1 to the main function activation state or the main function stop state by cooperating with the second operating state control unit 213.

A method of switching the operating state in the electronic device 1 performed by the first operating state control unit 113 and the second operation state control unit 213 cooperating with each other will be described below.

The second program processing unit 211 performs various arithmetic processing based on a program different from the first program, and controls various hardware on the basis of the result of the arithmetic processing, thereby performing the wristwatch function and the like. The second program is the above-described embedded program. The second program processing unit 211 starts when the electronic device 1 is turned on, and continues to operate regardless of switching of the operating state.

The display performed by the second program processing unit 211 on second display 28 is changed on the basis of a display mode set on the basis of a setting command from first operating state control unit 113. The setting command from the first operating state control unit 113 is output to the second operating state control unit 213. The second operating state control unit 213 stores, as display mode setting information 243, the input setting command in the second memory 24. The second program processing unit 211 sets a current display mode on the basis of the display mode setting information 243, and displays information corresponding to the set display mode. In the present embodiment, it is assumed that there are two display modes of, for example, "step number display mode" and "another display mode". However, the number of display modes is not limited, and three or more display modes may be prepared.

In the step number display mode, a display including a step number display such as the step number 64 illustrated in FIG. 1 is performed. Meanwhile, in another display mode, another information other than the number of steps is displayed. For example, a compass ring indicating an azimuth calculated using sensor information of the geomagnetic sensor, and information such as atmospheric pressure and altitude at the current position of the electronic device calculated using sensor information of an atmospheric pressure sensor are displayed.

The second program processing unit 211 may set an operating state of a sensor that acquires information that is not displayed to the stop state on the basis of the display mode. For example, when a display mode in which the atmospheric pressure and altitude are not displayed is set, the atmospheric pressure sensor may be stopped. Accordingly, it is possible to reduce the power consumption of the electronic device 1. However, in the main function activation state, it is necessary to perform the display of the cumulative information (in the present embodiment, the number of steps) using the first CPU 11. Thus, it is assumed that the second program processing unit 211 maintains an operating state of a sensor (for example, acceleration sensor) that acquires the cumulative information (in the present embodiment, the number of steps) in the operating state without changing the operating state thereof to the stop state at least in the main function activation state.

Similar to the first cumulative value management unit 112, the second cumulative value management unit 212 manages information related to the cumulative information. The second cumulative value management unit 212 manages the measurement value of the cumulative information measured by the measurement unit 214, the second correction value 241 for correcting the second cumulative value 242, and the second cumulative value 242 of the cumulative information calculated through this correction. The second correction value 241 and the second cumulative value 242 are stored in the second memory 24, and are appropriately updated to the latest values by the second cumulative value management unit 212.

The second cumulative value management unit 212 outputs the second cumulative value 242 to be managed to the second program processing unit 211. The embedded program which functions in the second program processing unit 211 and displays the timepieces displays, as the current number of steps of the user, the second cumulative value 242 input from the second cumulative value management unit 212 on the second display 28. Here, as described with reference to FIGS. 1, 3A, and 3B, the display of the second display 28 is displayed so as to be superimposed on the display of the first display 18. Accordingly, the display such as the step number 64 in the timepiece illustrated in FIG. 1 is performed.

The second operating state control unit 213 switches the operating state of the electronic device 1 to the main function activation state or the main function stop state by cooperating with the first operating state control unit 113.

The measurement unit 214 measures the cumulative information (in the present embodiment, the number of steps). The number of steps is measured on the basis of an output of a sensor (for example, an acceleration sensor) included in the sensor unit 26. The measurement unit 214 outputs the latest measurement value to the second cumulative value management unit 212 and the first cumulative value management unit 112 whenever the measurement value of the number of steps increases.

The measurement unit 214 resets the measurement value to "0" whenever the operating state is switched to the main function activation state or the main function stop state. This is based on the specification of the operating system operating in the first program processing unit 111 in consideration of the case where the measurement value needs to be set to "0" with the startup and shutdown of the operating system. Accordingly, the present embodiment can be applied to various devices including devices having an operating system in which the measurement value needs to be set to "0" according to the activation or shutdown of the operating system.

The switching of the operating state in the cumulative value management process, which is performed in cooperation with the first operating state control unit 113 and the second operating state control unit 213, is performed when the switching condition is satisfied.

The switching condition is not particularly limited. For example, a condition in which a switching command operation from the user is received, a condition in which any operation is not received from the user for a predetermined time, a condition in which a predetermined function needs to be activated, a condition in which a preset time has arrived, a condition in which the remaining quantity of the battery of the electronic device 1 is equal to or less than a predetermined quantity, or a condition in which the charging of the battery of the electronic device 1 is started or ended may be used as the switching condition.

The first operating state control unit 113 generates a setting command for enabling the second program processing unit 211 to set the display mode according to an operation of the user in order to perform the display when the operating state is switched. The first operating state control unit 113 outputs the generated setting command to the second program processing unit 211. As described above, the second operating state control unit 213 stores, as the display mode setting information 243, the setting command from the first operating state control unit 113 in the second memory 24. The second program processing unit 211 sets a current display mode on the basis of the display mode setting information 243, and displays information corresponding to the set display mode. The display mode may be set to a common display mode in the main function activation state and the main function stop state, or the display mode in the main function activation state and the display mode in the main function stop state may be set as display modes different from each other. In this case, the first operating state control unit 113 issues a setting command for each of the display mode in the main function activation state and the display mode in the main function stop state.

The generation and output of the display mode setting information by the first operating state control unit 113 can be performed at any timing in the main function activation state.

Next, a case where the switching condition is satisfied and the switching from the main function activation state to the main function stop state is performed will be described.

In this case, the first operating state control unit 113 puts the first display 18, the touch panel 19, and the GPS module 36 into a stop state (or a sleep state). For this purpose, for example, the first operating state control unit 113 outputs a control signal for switching to the stop state (or the sleep state) to each of these units, or stops power supply to these units.

Thereafter, the first operating state control unit 113 instructs the first program processing unit 111 to perform a shutdown process. When the first program processing unit 111 performs shutdown on the basis of the instruction, each hardware including the first CPU 11 enters a stop state (or a sleep state). Thereby, the electronic device 1 is switched to the main function stop state. In this main function stop state, a process of displaying a clock on the second display 28 can be performed, and power consumption can be reduced more than in the main function activation state.

Next, a case where the switching condition is satisfied and switching from the main function stop state to the main function activation state will be described.

In this case, the second operating state control unit 213 activates the stopped first CPU 11 by outputting a control signal for activating the first CPU 11 to the first CPU 11. Accordingly, each functional block illustrated in FIG. 4 functions in the first CPU 11. Thus, the first operating state control unit 113 sets the first display 18, the touch panel 19, and the GPS module 36 to be in the activation state. Thus, for example, the first operating state control unit 113 outputs a control signal for switching to the activation state to each of these units, or starts power supply to these units. Accordingly, the electronic device 1 is switched to the main function activation state. In this main function activation state, it is possible to perform the process for realizing the function of displaying the timepiece and the functions similar to the smartphone.

Thereafter, the first operating state control unit 113 and the second operating state control unit 213 repeat the switching of the operating state whenever the switching condition is satisfied. Accordingly, the switching of the operating state in the cumulative value management process is performed.

Figure 5:
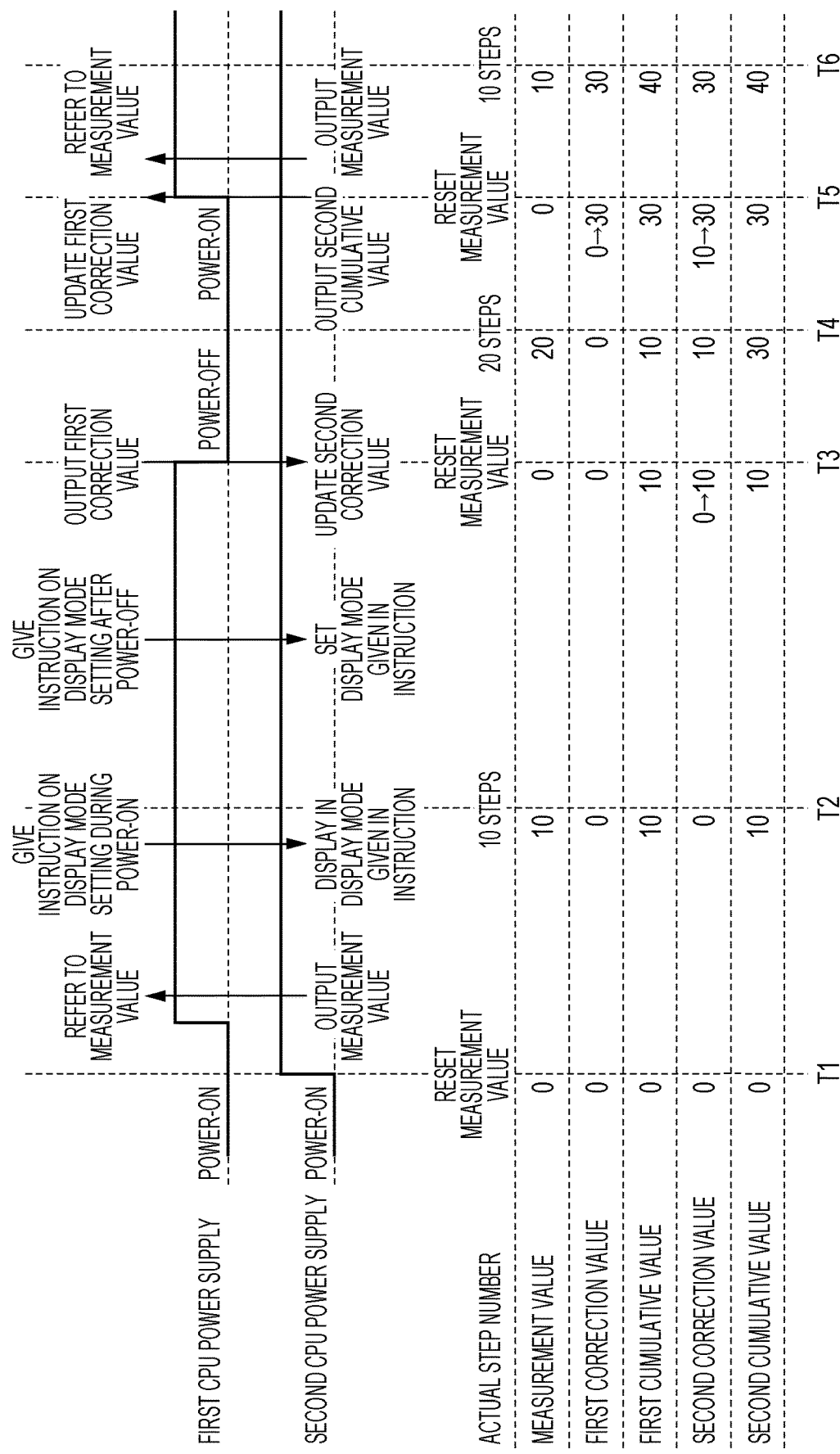
FIG. 5 is a timing chart for describing a concept of management of cumulative information in the cumulative value management process performed by the electronic device of FIG. 1 having the functional configuration of FIG. 4.

FIG. 5 is a timing chart for describing the concept of management of the cumulative information in the cumulative value management process performed by the electronic device of FIG. 1 having the functional configuration of FIG. 4.

This timing chart illustrates changes of the power-on and -off states of the first CPU 11 and the second CPU 21 in accordance with the switching of the operating state, the values managed by the first cumulative value management unit 112 and the second cumulative value management unit 212, and the number of steps measured by the measurement unit 214 in a sequence of time.

Initially, it is assumed that the electronic device 1 is powered on at time T1. Accordingly, the transition to the main function activation state is performed. In this case, the power supply of the second CPU 21 is in a turned-on state (activation state), and a predetermined activation process is performed. The measurement value measured by the measurement unit 214 is reset to "0". Subsequently, the power supply of the first CPU 11 is in a turned-on state (activation state), and a predetermined activation process is performed. The measurement of the number of steps using the measurement unit 214, the output of the measurement value to each of the first cumulative value management unit 112 and the second cumulative value management unit 212, and the management of the values using the first cumulative value management unit 112 and the second cumulative value management unit 212 are started.

At time T1, the measurement value measured by the measurement unit 214 is "0". The first cumulative value 142 and the second cumulative value 242 are also "0". This is because the cumulative value is calculated by an expression of "cumulative value=measurement value+correction value", but a process related to the correction value is not performed and the correction value is "0" at this point of time.

At time T2, it is assumed that the user walks 10 steps from time T1. In this case, the measurement value measured by the measurement unit 214 is "10". The first cumulative value 142 and the second cumulative value 242 are also "10". This is because the correction value is "0" even at this point of time.

In parallel with the management of these values, the first operating state control unit 113 generates the setting command of the display mode, and outputs the generated command to the second CPU 21 at a timing when the operation of the user is received. The second program processing unit 211 performs the display in the display mode set according to the command when the display on the first display 18 using the first program processing unit 111 is not performed during the power-on of the first CPU 11 (that is, in the main function operating state). The second program processing unit 211 performs the display in the display mode set according to the command after the power-off of the first CPU 11 (that is, in the main function stop state).

Thereafter, it is assumed that the user does not work and the transition to the main function stop state is performed at time T3. Accordingly, the power supply of the first CPU 11 is in a turned-off state (stop state). The first cumulative value management unit 112 outputs a value of "0" which is the value of the first correction value 141 managed by the first cumulative value management unit 112 itself to the second cumulative value management unit 212. The second cumulative value management unit 212 resets the value of the second correction value 241 managed by the second cumulative value management unit 212 itself to "0" on the basis of "0" which is the value of the first correction value 141. The second cumulative value management unit 212 sets the value of the second cumulative value 242 managed by the second cumulative value management unit 212 itself to "10" by adding the value "10" of the measurement value to "0" which is the value of the second correction value 241. The second cumulative value management unit 212 sets the value of the second correction value 241 to "10" on the basis of the value of "10" of the second cumulative value 242. The measurement value measured by the measurement unit 214 is reset to "0". As stated above, in the main function activation state, the first cumulative value management unit 112 that manages the cumulative value appropriately continues the management of the cumulative value by outputting (that is, taking over) the value of the first correction value 141 managed by the first cumulative value management unit 112 itself to the second cumulative value management unit 212. Accordingly, the first cumulative value 142 and the second cumulative value 242 are "10".

At time T4, it is assumed that the user walks 20 steps from time T3. In this case, the measurement value measured by the measurement unit 214 is "20". Since the first CPU 11 is stopped, the first cumulative value management unit 112 is not operated, and thus, the first cumulative value 142 is still "10" with no change from time T4. Meanwhile, since the second cumulative value management unit 212 continues the management based on the second correction value 241 set by the taking over, the second cumulative value 242 is calculated as "30" on the basis of the measured value of "20" and the second correction value 241 of "10". That is, the same value as the number of steps of the user from time T1 is appropriately calculated.

Thereafter, at time T5, it is assumed that the user does not walk and the transition to the main function activation state is performed again. Accordingly, the measurement value measured by the measurement unit 214 is reset to "0". Meanwhile, the power supply of the first CPU 11 is in the turned-on state (activation state). The second cumulative value management unit 212 sets the value of the second correction value 241 managed by the second cumulative value management unit 212 itself to "30" which is the value of the second cumulative value 242 at the current point of time. The second cumulative value management unit 212 outputs the value of "30" which is the value of the second cumulative value 242 to the first cumulative value management unit 112. The first cumulative value management unit 112 that starts the operation again when the power supply of the first CPU 11 is in the turned-on state sets the value of the first correction value 141 managed by the first cumulative value management unit itself to "30". As described above, in the main function stop state, the second cumulative value management unit 212 that manages the cumulative value appropriately continues the management of the cumulative value by outputting (that is, taking over) the value of the second cumulative value 242 managed by the second cumulative value management unit 212 itself to the first cumulative value management unit 112. Accordingly, the first cumulative value 142 and the second cumulative value 242 are "30".

At time T6, it is assumed that the user walks 10 steps from time T5. In this case, the measurement value measured by the measurement unit 214 is "10". Since the first cumulative value management unit 112 continues the management based on the first correction value 141 set by the taking over, the first cumulative value 142 is calculated as "40" on the basis of the measurement value of "10" and the first correction value 141 of "30". Similarly, since the second cumulative value management unit 212 continues the management, the second cumulative value 242 is calculated as "40" on the basis of the measurement value of "10" and the second correction value 241 of "30". That is, the same value as the number of steps of the user from time T1 is appropriately calculated.

As described with reference to FIG. 5, according to the present embodiment, since the management is continued by using the cumulative value of the one management unit as the correction value of the other management unit, the electronic device 1 including the plurality of arithmetic processing units can appropriately manage the cumulative information.

Figure 6:
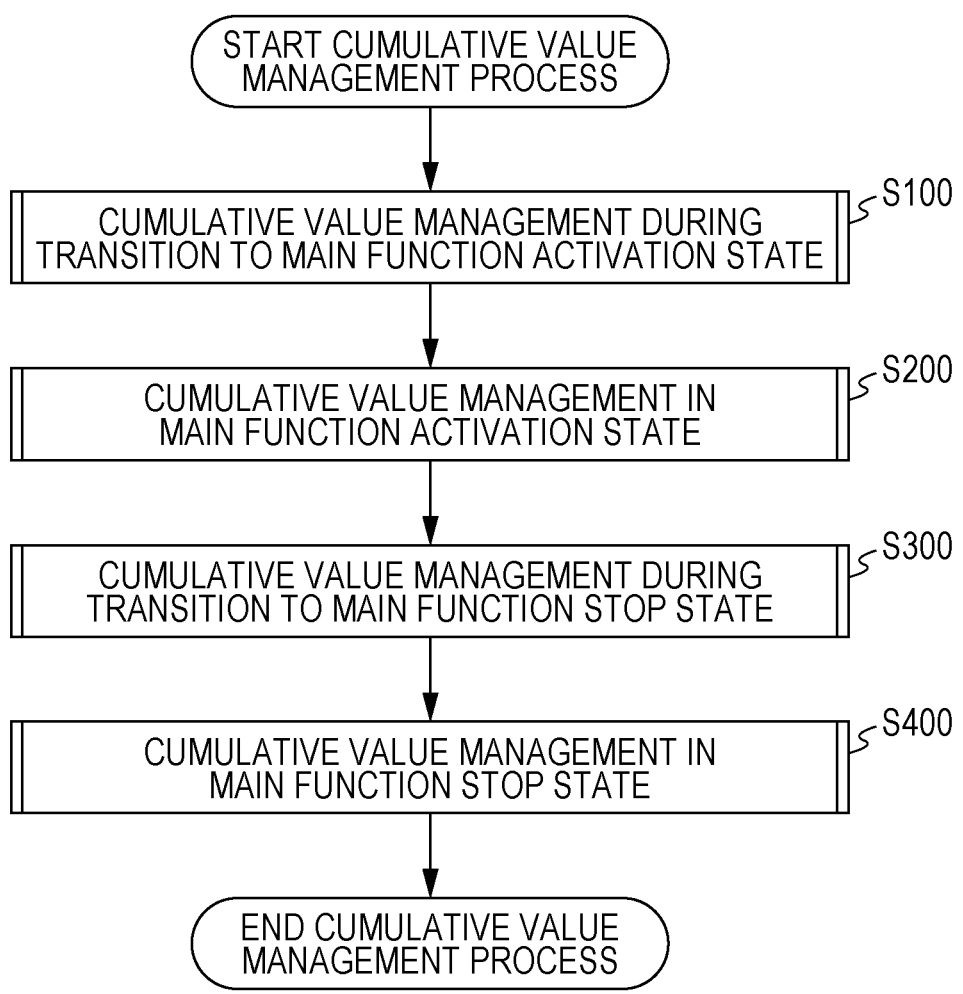
FIG. 6 is a flowchart for describing a flow of the cumulative value management process performed by the electronic device 1 of FIG. 1 having the functional configuration of FIG. 4.

FIG. 6 is a flowchart for describing a flow of the cumulative value management process performed by the electronic device 1 of FIG. 1 having the functional configuration of FIG. 4.

For example, the cumulative value management process together with the transition to the main function operating state when the electronic device 1 is powered on or the switching condition is satisfied is started.

In step S100, the electronic device 1 performs the cumulative value management during the transition to the main function activation state.

In step S200, the electronic device 1 performs cumulative value management in the main function activation state.

In step S300, electronic device 1 performs the cumulative value management during the transition to the main function stop state.

In step S400, the electronic device 1 performs the cumulative value management in the main function stop state.

When step S400 is ended, the cumulative value management process is ended. In a case where the transition to the main function activation state is performed when the electronic device 1 is powered on again or the switching condition is satisfied, the process is performed again from step S100.

The detailed process in each of these steps will be described with reference to FIGS. 7 to 10.

Figure 7:
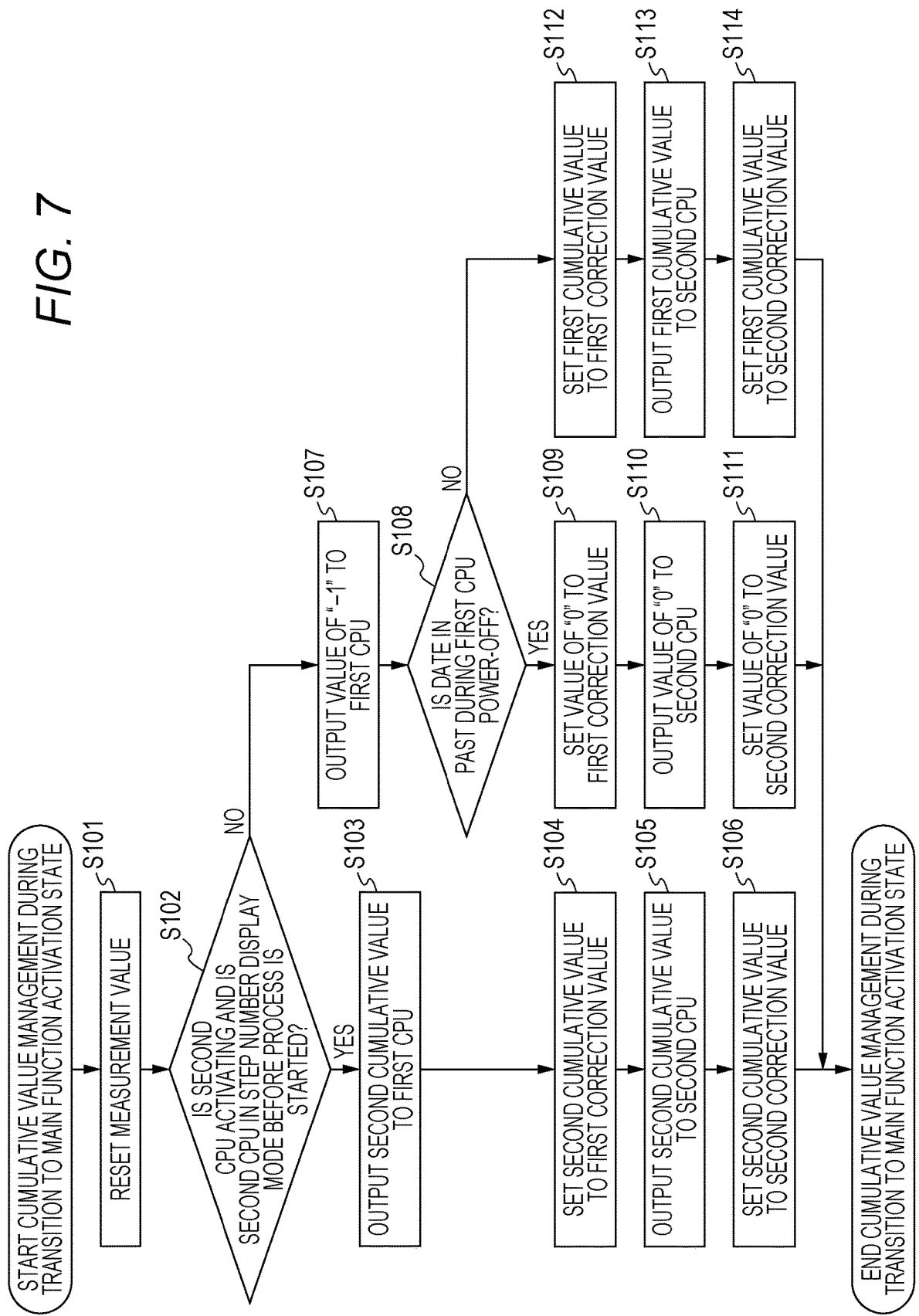
FIG. 7 is a flowchart for describing a flow of the cumulative value management process during transition to a main function activation state included in the cumulative value management process performed by the electronic device of FIG. 1 having the functional configuration of FIG. 4.

Initially, the detailed process of step S100 will be described. FIG. 7 is a flowchart for describing a flow of the cumulative value management process (corresponding to step S100 of FIG. 6) during the transition to the main function activation state included in the cumulative value management process performed by the electronic device of FIG. 1 having the functional configuration of FIG. 4.

In step S101, the measurement unit 214 resets the measurement value measured by the measurement unit itself to "0".

In step S102, the second cumulative value management unit 212 determines whether or not the second CPU 21 is activated and the display in the step number display mode is performed before the present process is started. That is, it is determined whether or not the second cumulative value 242 is managed by activating the second CPU 21 and performing the display in the step number display mode before the present process is started. When the second cumulative value 242 is managed, it is determined as Yes in step S102, and the process proceeds to step S103. Meanwhile, when the second cumulative value 242 is not managed, it is determined as No in step S102, and the process proceeds to step S107.

In step S103, the second cumulative value management unit 212 outputs the second cumulative value 242 to the first cumulative value management unit 112 of the first CPU 11.

In step S104, the first cumulative value management unit 112 sets the input second cumulative value 242 to the first correction value 141. Accordingly, the taking over is performed as represented at time T5 in FIG. 5.

In step S105, the first cumulative value management unit 112 outputs the input second cumulative value 242 to the second cumulative value management unit 212.

In step S106, the second cumulative value management unit 212 sets the input second cumulative value 242 to the second correction value 241. Accordingly, the correction value and the cumulative value managed by the first cumulative value management unit 112 and the second cumulative value management unit 212 are synchronized. The cumulative value management process during the transition to the main function activation state is ended. When the first cumulative value management unit 112 is likely to refer to the second cumulative value 242 acquired by adding the past second correction value 241 and the measurement value reset to "0" before step S106 is performed, the same process as that of step S106 may be separately performed in advance before the first cumulative value management unit 112 is used.

In step S107, the second cumulative value management unit 212 outputs a value "−1" to the first cumulative value management unit 112 of the first CPU 11. This is a value indicating that the second cumulative value 242 is not managed.

In step S108, the first cumulative value management unit 112 determines whether or not the date is in the past during the power-off of the first CPU 11 (that is, during the power-off of the electronic device 1 itself or during the main function stop state). That is, it is determined whether or not today is the day after the day when the first cumulative value management unit 112 is last operated in the main function activation state. When the date is in the past, it is determined as Yes in step S108, and the process proceeds to step S109.

Meanwhile, when the date is not in the past, it is determined as No in step S108, and the process proceeds to step S112.

In step S109, the first cumulative value management unit 112 sets a value of "0" to the first correction value 141. Accordingly, the measurement of the number of steps for today is started from a zero step.

In step S110, the first cumulative value management unit 112 outputs a value of "0" to the second cumulative value management unit 212.

In step S111, the second cumulative value management unit 212 sets the input value of "0" to the second correction value 241. Accordingly, the correction value and the cumulative value managed by the first cumulative value management unit 112 and the second cumulative value management unit 212 are synchronized. The cumulative value management process during the transition to the main function activation state is ended.

In step S112, the first cumulative value management unit 112 sets the first cumulative value 142 to the first correction value 141. Accordingly, the measurement of the number of steps for today is started continuously from the first cumulative value 142 when the first cumulative value management unit 112 is last operated in the main function activation state.

In step S113, the first cumulative value management unit 112 outputs the value of the first cumulative value 142 to the second cumulative value management unit 212.

In step S114, the second cumulative value management unit 212 sets the input value of the first cumulative value 142 to the second correction value 241. Accordingly, the correction value and the cumulative value managed by the first cumulative value management unit 112 and the second cumulative value management unit 212 are synchronized. The cumulative value management process during the transition to the main function activation state is ended.

Figure 8:
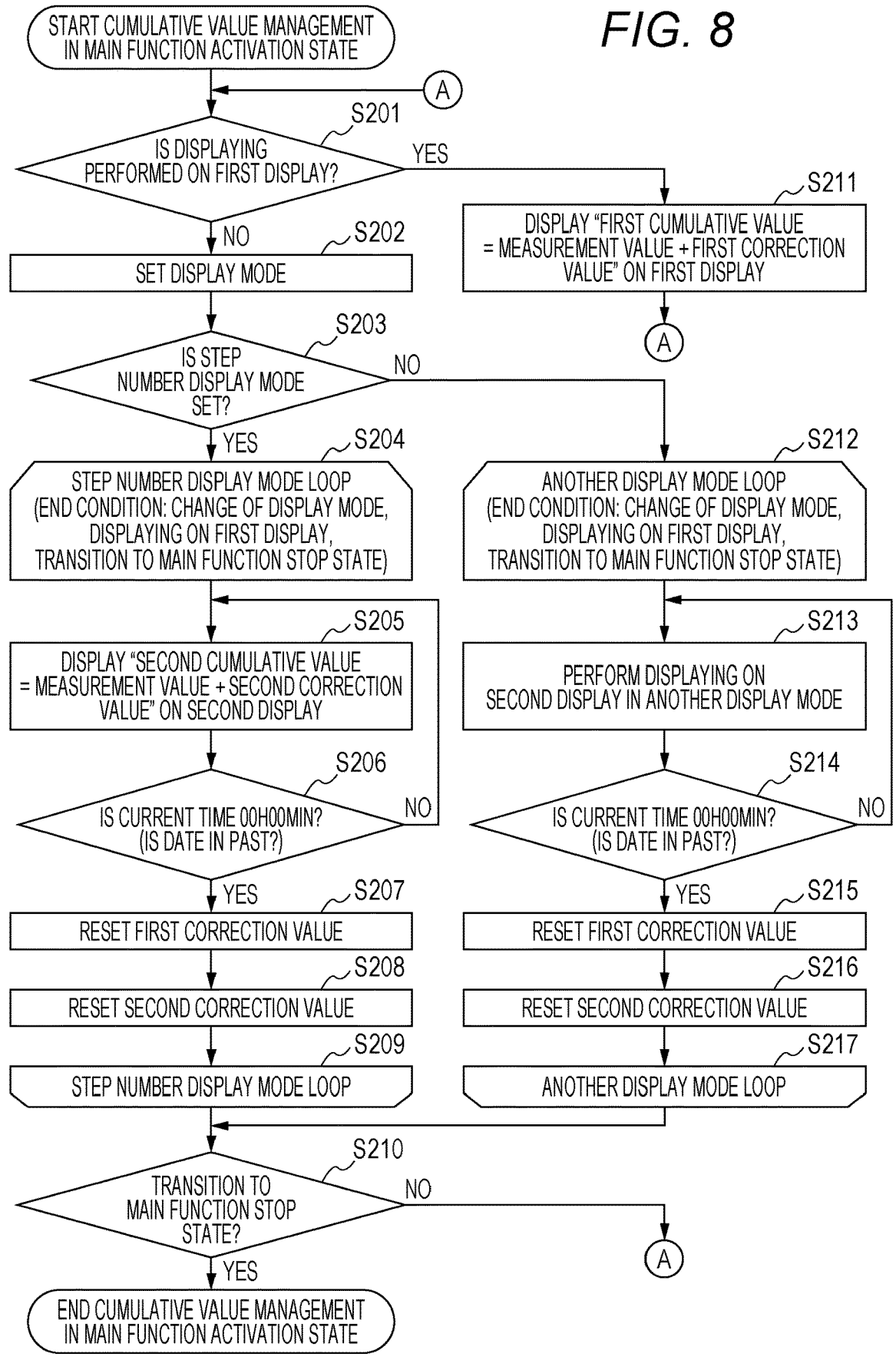
FIG. 8 is a flowchart for describing a flow of the cumulative value management process in the main function activation state included in the cumulative value management process performed by the electronic device of FIG. 1 having the functional configuration of FIG. 4.

Next, the detailed process of step S200 will be described. FIG. 8 is a flowchart for describing a flow of the cumulative value management process (corresponding to step S200 of FIG. 6) in the main function activation state included in the cumulative value management process performed by the electronic device of FIG. 1 having the functional configuration of FIG. 4. In the process of this drawing, it is assumed that the measurement of the number of steps using the measurement unit 214 and the updating of the values managed by the first cumulative value management unit 112 and the second cumulative value management unit 212 are sequentially performed with the start of step S200.

In step S201, the second program processing unit 211 determines whether or not the first program processing unit 111 performs the display on the first display 18. When the first program processing unit 111 performs the display on the first display 18, it is determined as Yes in step S201, and the process proceeds to step S211. In step S211, the first program processing unit 111 displays the first cumulative value 142 on the first display 18. The first cumulative value 142 is calculated by adding the first correction value 141 to the measured value.

Meanwhile, when the first program processing unit 111 does not perform the display on the first display 18, it is determined as No in step S201, and the process proceeds to step S202.

In step S202, the second program processing unit 211 sets the display mode on the basis of the display mode setting information 243.

In step S203, the second program processing unit 211 determines whether or not the step number display mode is set. When the step number display mode is set, it is determined as Yes in step S203, and the process proceeds to step S204. Meanwhile, when a display mode (in this embodiment, "another display mode") other than the step number display mode is set, it is determined as No in step S203, and the process proceeds to step S212.

In step S204, a step number display mode loop (loop from step S204 to step S208) is started. As the end condition of the present step number display mode loop, there are three conditions of (1) a condition in which the display mode setting information 243 is updated and the display mode is changed according to the operation of the user, (2) a condition in which the first program processing unit 111 starts the display on the first display 18, and (3) a condition in which the switching condition is satisfied and the transition to the main function stop state is performed. The present step number display mode is repeated until any one of the conditions (1), (2), and (3) is satisfied. Meanwhile, when any one of the conditions (1), (2), and (3) is satisfied, the present step number display mode loop is ended, and the process proceeds to step S209.

In step S205, the second program processing unit 211 displays the second cumulative value 242 on the second display 28. The second cumulative value 242 is calculated by adding the second correction value 241 to the measured value.

In step S206, the first cumulative value management unit 112 determines whether or not a current time is 00 h 00 min. That is, it is determined whether or not the date is in the past. When the date is in the past, it is determined as Yes in step S206, and the process proceeds to step S207. Meanwhile, when the date is not in the past, it is determined as No in step S206, and the process continues the display in step S205.

In step S207, the first cumulative value management unit 112 resets the first correction value 141 to "0". Similarly, in step S208, the second cumulative value management unit 212 resets the second correction value 241 to "0". The setting of the second correction value 241 to "0" in step S208 may be voluntarily performed by the second cumulative value management unit 212, or may be performed by a command from the first cumulative value management unit 112. Accordingly, the correction value and the cumulative value managed by the first cumulative value management unit 112 and the second cumulative value management unit 212 are synchronized, and the number of steps on a new day is managed from a zero step.

In step S209, the present step number display mode loop is repeated until the end condition as the description of step S204 is satisfied.

In step S212, another display mode loop (a loop from step S212 to step S217) is started. An end condition of another display mode loop is the same as that of the step number display mode loop described above (the loop from step S204 to step S209). Thus, the redundant description will be omitted.

In step S213, the second program processing unit 211 displays information corresponding to another display mode on the second display 28. In another display mode loop, the number of steps is not displayed, but the number of steps is managed in the same manner as the above-described step number display mode loop.

Subsequent steps S214, S215, S216, and S217 are the same processes as steps S206, S207, S208, and S209 of the above-described step number display mode loop. Thus, the redundant description will be omitted.

In step S210, the first cumulative value management unit 112 and the second cumulative value management unit 212 determine whether or not the switching condition is satisfied and the transition to the main function stop state is performed. When the transition to the main function stop state is performed, it is determined as Yes in step S210, and the cumulative value management process in the main function activation state is ended. Meanwhile, when the transition to the main function stop state is not performed, it is determined as No in step S210, and the process returns to step S201, and the processes are repeated.

Figure 9:
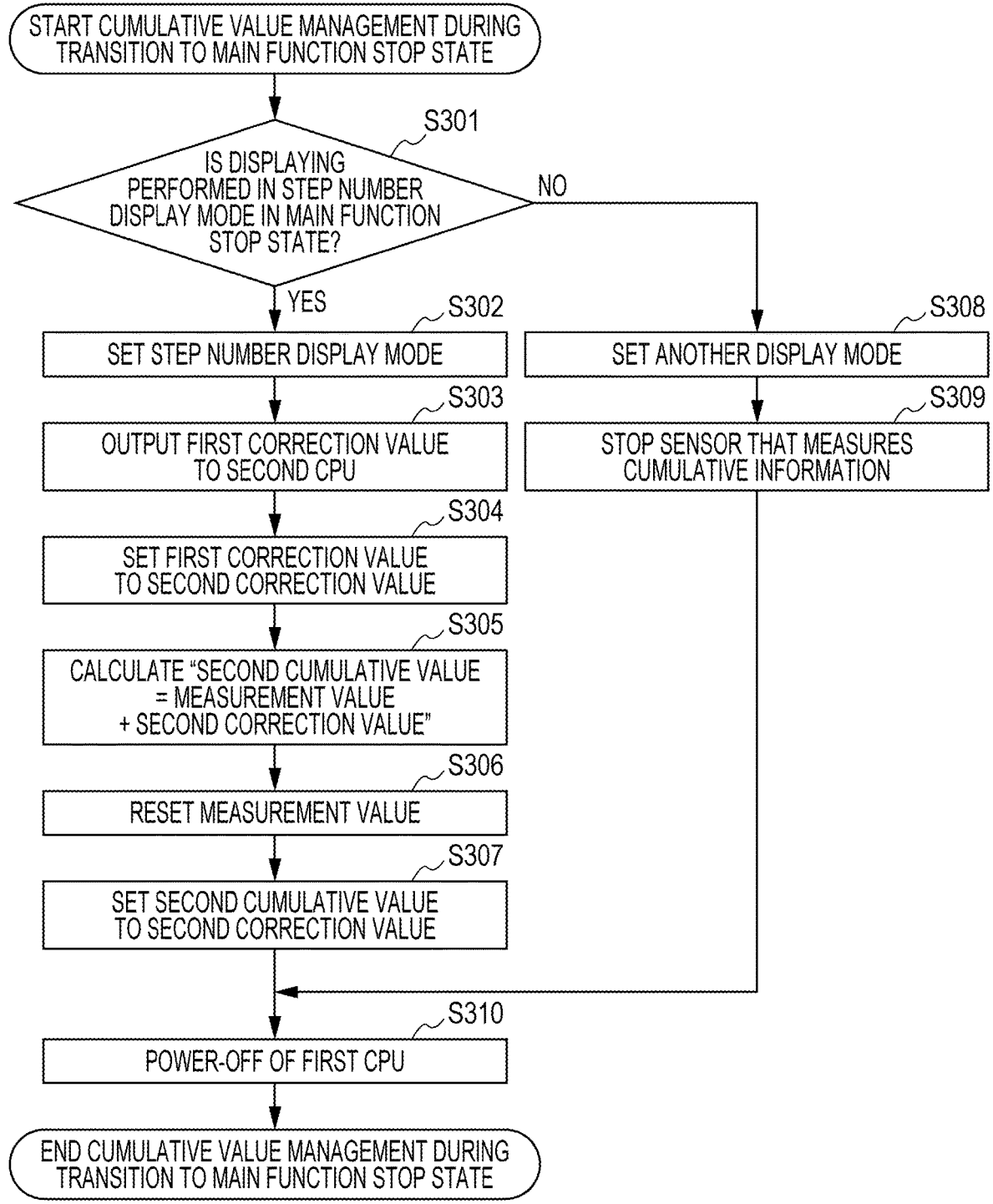
FIG. 9 is a flowchart for describing a flow of the cumulative value management process during the transition to a main function stop state included in the cumulative value management process performed by the electronic device of FIG. 1 having the functional configuration of FIG. 4.

Next, the detailed process of step S300 will be described. FIG. 9 is a flowchart for describing a flow of the cumulative value management process (corresponding to step S300 of FIG. 6) during the transition to the main function stop state included in the cumulative value management process performed by the electronic device of FIG. 1 having the functional configuration of FIG. 4.

In step S301, the second program processing unit 211 confirms the display mode setting information 243, and determines whether or not the display mode to be set in the main function stop state is the step number display mode. When the display mode is the step number display mode, it is determined as Yes in step S301, and the process proceeds to step S302. Meanwhile, when the display mode is not the step number display mode, it is determined as No in step S301, and the process proceeds to step S308.

In step S302, the second program processing unit 211 sets the display mode to the step number display mode.

In step S303, the first cumulative value management unit 112 outputs the first correction value 141 to the second cumulative value management unit 212 of the second CPU 21.

In step S304, the second cumulative value management unit 212 sets the input first correction value 141 to the second correction value 241.

In step S305, the second cumulative value management unit 212 calculates the second cumulative value 242. The second cumulative value 242 is calculated by adding the second correction value 241 set in step S304 to the measured value.

In step S306, the measurement unit 214 resets the measurement value measured by the measurement unit itself to "0".

In step S307, the second cumulative value management unit 212 sets the second cumulative value 242 calculated in step S306 to the second correction value 241. Accordingly, the taking over is performed at time T3 in FIG. 5. Accordingly, the correction value and the cumulative value managed by the first cumulative value management unit 112 and the second cumulative value management unit 212 are synchronized.

In step S308, the second program processing unit 211 sets the display mode to another display mode. In this case, the number of steps is not managed in the main function stop state.

In step S309, a sensor (for example, acceleration sensor) that measures the cumulative information (here, the number of steps) included in the sensor unit 26 is set to the stop state. This is because the number of steps is not managed in the main function stop state in another display mode. The sensor is set in the stop state as stated above, and thus, it is possible to reduce power consumption. However, the sensor that measures information to be displayed in another display mode is maintained in the activation state.

In step S310, the first operating state control unit 113 stops the first CPU 11 by turning off the power of the first CPU 11. Accordingly, the cumulative value management process during the transition to the main function stop state is ended.

Figure 10:
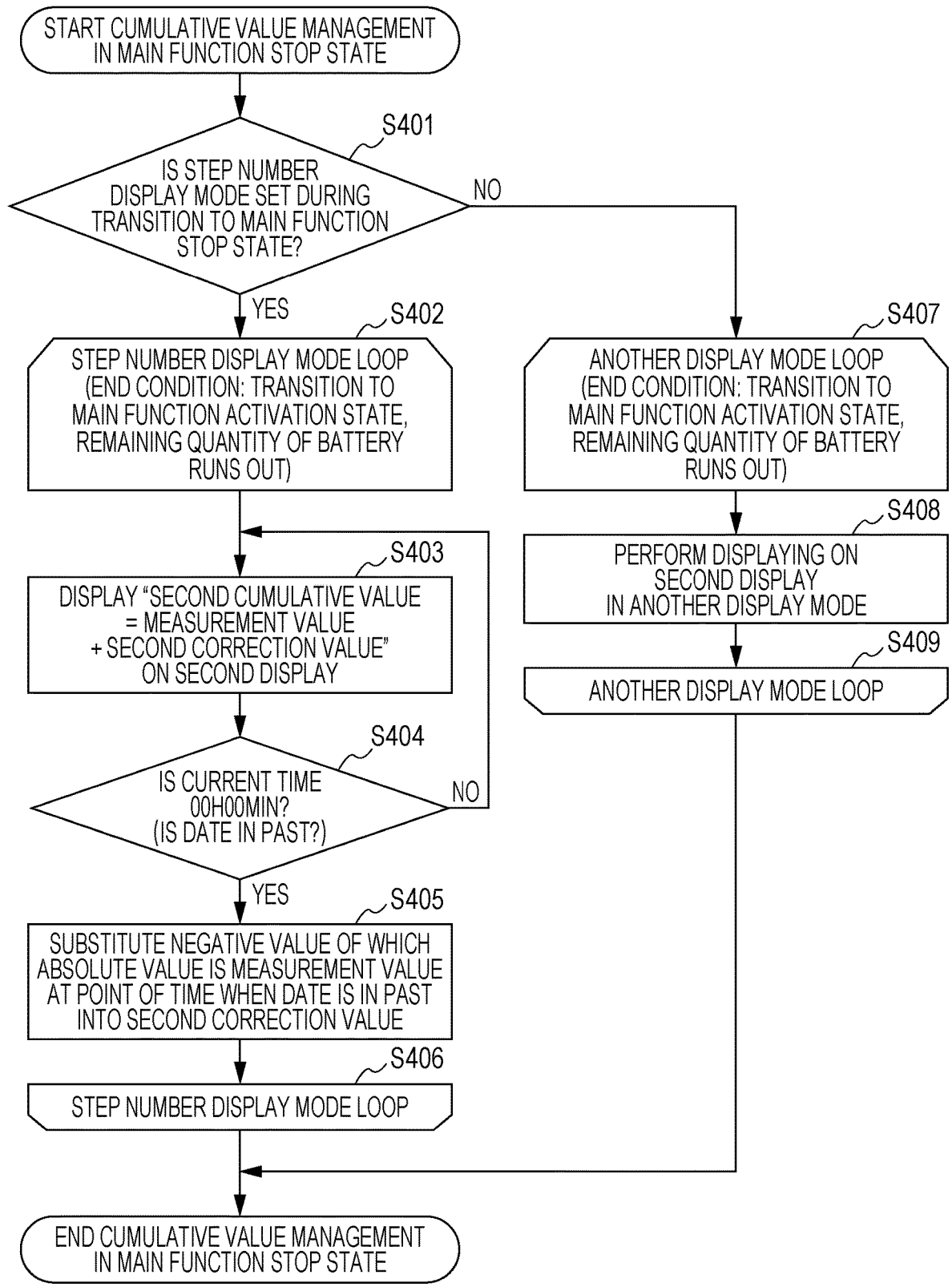
FIG. 10 is a flowchart for describing a flow of the cumulative value management process in the main function stop state included in the cumulative value management process performed by the electronic device of FIG. 1 having the functional configuration of FIG. 4.

Ultimately, the detailed process of step S400 will be described. FIG. 10 is a flowchart for describing a flow of the cumulative value management process (corresponding to step S400 in FIG. 6) in the main function stop state included in the cumulative value management process performed by the electronic device of FIG. 1 having the functional configuration of FIG. 4.

In step S401, the second cumulative value management unit 212 determines whether or not the display mode is set to the step number display mode during the transition to the main function stop state. When the step number display mode is set, it is determined as Yes in step S401, and the process proceeds to step S402. Meanwhile, when the step number display mode is not set, it is determined as No in step S401, and the process proceeds to step S407.

In step S402, a step number display mode loop (a loop from step S402 to step S206) is started. In the process of this drawing, it is assumed that the measurement of the number of steps using the measurement unit 214 and the updating of the values managed by the second cumulative value management unit 212 are sequentially performed with the start of step S402.

As the end condition of the present step number display mode loop, there are two conditions of (1) a condition in which the switching condition is satisfied and the transition to the main function activation state is performed and (2) the remaining quantity of the battery for operating the electronic device 1 runs out. The step number display mode is repeated until any one of the conditions (1) and (2) is satisfied. Meanwhile, when any one of the conditions (1) and (2) is satisfied, the step number display mode loop is ended, and the process proceeds to step S207.

In step S403, the second program processing unit 211 displays the second cumulative value 242 on the second display 28. The second cumulative value 242 is calculated by adding the second correction value 241 to the measured value.

In step S404, the first cumulative value management unit 112 determines whether or not a current time is 00 h 00 min. That is, it is determined whether or not the date is in the past. When the date is in the past, it is determined Yes in step S404, and the process proceeds to step S405. Meanwhile, when the date is not in the past, it is determined as No in step S404, and the process continues the display in step S403.

In step S405, the second cumulative value management unit 212 substitutes a negative value of which an absolute value is the measurement value at a point of time when the date is in the past into the second correction value 241. Accordingly, the measurement value itself is not reset, but the second cumulative value 242 is "0" by the second correction value 241. That is, the number of steps is apparently "0". Accordingly, the number of steps for a new day is managed from a zero step. In such a case, when the transition to the main function activation state is performed again, the first cumulative value management unit 112 sets the input second cumulative value 242 to the first correction value 141 in step S104 described above. Accordingly, the taking over is performed as represented at time T5 in FIG. 5. Thus, even when the date is in the past, it is possible to appropriately manage the cumulative value.

In step S406, the present step number display mode loop is repeated until the end condition as the description of step S402 is satisfied.

In step S407, another display mode loop (a loop from step S407 to step S49) is started. An end condition of another display mode loop is the same as that of the step number display mode loop described above (the loop from step S402 to step S406). Thus, the redundant description will be omitted. When another display mode loop is performed and then the transition to the main function activation state is performed, the second cumulative value 242 measured before the transition to another display mode loop is performed is not used (see No in step S102, and steps S107 to S114). Thus, in another display mode loop, the process for correcting the second cumulative value 242 according to the fact that the data is in the past, such as steps S404 and S405 in the above-described step number display mode loop, can be omitted.

When the end condition as the description of step S402 is satisfied, the step number display mode loop and another display mode loop are ended, and the cumulative value management process in the main function stop state is also ended. Accordingly, the cumulative value management process illustrated in FIG. 6 is ended. In a case where the transition to the main function activation state is performed when the electronic device 1 is powered on again or the switching condition is satisfied, the process is performed again from step S100.

According to the cumulative value management process described above, since the cumulative value of the one management unit is continued to be managed as the correction value of the other management unit, the electronic device 1 including the plurality of arithmetic processing units can appropriately manage the cumulative information.

As stated above, the cumulative value of the appropriately managed cumulative information can be displayed on the display corresponding to each CPU, and can be notified to the user.

According to the cumulative value management process described above, it is possible to manage the number of steps on a new day from a zero step even when the date is in the past.

Next, some modification examples obtained by modifying the above-described embodiment will be described. However, the modification examples to be described below are merely examples, and do not limit modification examples to which the present embodiment is applicable. It is also possible to combine the modification examples described below.

In the above-described embodiment, the number of steps is used as the cumulative information. However, the present invention is not limited thereto, and the heart rate or the calorie consumption cumulated according to the usage state of the user who uses the electronic device 1 may be used as the cumulative information.

In the above-described embodiment, the process for setting the cumulative value to "0" is performed when the date is in the past. However, the present invention is not limited thereto, and the process for setting the cumulative value to "0" may not be performed even when the date is in the past. An integrated value of cumulative values for several days may be managed and displayed. Both the cumulative value for each day managed by the process for setting the cumulative value to "0" and the integrated value of the cumulative values for several days may be managed and displayed. When there is the operation of the user, the cumulative value may be accordingly reset to "0".

In the above-described embodiment, the cumulative information is managed in the electronic device 1 including the plurality of arithmetic processing units by managing the cumulative value of one management unit as the correction value of the other management unit. However, the present invention is not limited thereto, and the cumulative information may be managed by a method not using a correction value. For example, the management of the cumulative information may be continued by outputting the cumulative value of the cumulative information displayed on the display corresponding to one management unit to the other management unit. Accordingly, it is possible to appropriately manage the cumulative information while reducing the management process of the cumulative information.

The electronic device 1 having the above-described configuration includes the sensor unit 26, the first cumulative value management unit 112, and the second cumulative value management unit 212.

The sensor unit 26 acquires the cumulative information.

The first cumulative value management unit 112 functions in the first CPU 11, and manages the cumulative information.

The second cumulative value management unit 212 functions in the second CPU 21, and manages the cumulative information.

The first cumulative value management unit 112 and the second cumulative value management unit 212 output the cumulative information managed by the one management unit to the other management unit according to the switching of the operating state of the first CPU 11, and the other management unit continues the management of the cumulative information on the basis of the cumulative information output from the one management unit.

Accordingly, since each management unit outputs (that is, takes over) the cumulative information to the other management unit during the switching of the operating state of a part of the arithmetic processing units, the electronic device including the plurality of arithmetic processing units can appropriately manage the cumulative information.

When the first cumulative value management unit 112 and the second cumulative value management unit 212 function as the other management unit, the other management unit continues the management of the cumulative information by using the cumulative information output from one management unit as the correction value used in the correction of the cumulative value of the cumulative information.

Accordingly, the other measurement unit can appropriately correct the measurement value on the basis of the cumulative information managed by one management unit.

When the operating state of the first CPU 11 is switched from the stop state to the activation state, the second cumulative value management unit 212 outputs the cumulative information managed by the second cumulative value management unit 212 itself to the first cumulative value management unit 112, and the first cumulative value management unit 112 continues the management of the cumulative information on the basis of the cumulative information output from the second cumulative value management unit 212.

Accordingly, it is possible to appropriately manage the cumulative information by the first cumulative value management unit 112 while the operating state of the first CPU 11 is in the activation state.

When the operating state of the first CPU 11 is switched from the activation state to the stop state, the first cumulative value management unit 112 outputs the cumulative information managed by the first cumulative value management unit 112 itself to the second cumulative value management unit 212, and the second cumulative value management unit 212 continues the management of the cumulative information on the basis of the cumulative information output from the first cumulative value management unit 112.

Accordingly, it is possible to appropriately manage the cumulative information by the second cumulative value management unit 212 while the operating state of the second CPU 21 is in the activation state.

The first cumulative value management unit 112 and the second cumulative value management unit 212 perform control for displaying the cumulative information managed by the management unit itself on the display corresponding to the management unit itself.

Accordingly, since each management unit performs the display, the user can refer to the cumulative information regardless of the operating state of a part of the arithmetic processing units.

The electronic device 1 further includes the measurement unit 214 that functions in the second CPU 21.

The sensor unit 26 is connected to the second CPU 21, and outputs the acquired cumulative information to the measurement unit 214.

The measurement unit 214 measures the cumulative information output from the sensor unit 26, and outputs the measured values to the first cumulative value management unit 112 and the second cumulative value management unit 212.

Accordingly, the present embodiment can be achieved even when the sensor unit 26 is not connected to the first CPU 11. The first cumulative value management unit 112 can manage the cumulative information without performing the process for measuring the cumulative information, and can perform the display.

The operating system functioning in the first CPU 11 performs a process for resetting the measurement value of the cumulative information according to the switching of the operating state of the first CPU 11.

At least any one of the first cumulative value management unit 112 and the second cumulative value management unit 212 continues the management of the cumulative information by correcting the corresponding first or second cumulative value using the corresponding first or second correction value and the measurement value reset by the operating system.

Accordingly, even in the specification in which the operating system resets the measurement value (for example, resets the measurement value to "0"), the cumulative information can be accordingly managed. Even in this case, it is possible to appropriately manage the value of the cumulative information.

The cumulative information includes at least any one of the number of steps, the heart rate, and the calorie consumption.

Accordingly, it is possible to manage, as the cumulative information, biometric information related to the user such as the number of steps, the heart rate, or the calorie consumption.

Although the embodiment and the modification examples have been described, the embodiment and the modification examples are merely examples, and do not limit the technical scope of the present invention. The present invention can take various other embodiments and modification examples, and various changes such as modifications, improvements, omissions, and substitutions can be made without departing from the gist of the present invention. The embodiment and the modification examples, and the changes thereof are included in the scope and gist of the invention described in the present specification, and are included in the invention described in the claims and the equivalents thereof.

Although it has been described in the above-described embodiment and the modification examples that the wristwatch type device (smartwatch) is used as the electronic device 1, the present invention is not particularly limited thereto.

For example, the present embodiment can be applied to general electronic devices. For example, the present embodiment can be applied to a stationary personal computer, a laptop personal computer, a smartphone, a mobile phone, a portable game machine, a digital camera, a video camera, a portable navigation device, and a multifunction machine.

The series of processes described above can be performed by hardware, or can be executed by software.

In other words, the functional configuration of FIG. 4 is merely an example, and is not particularly limited. That is, the electronic device 1 may have a function capable of performing the series of processes described above as a whole, and a functional block for performing this function is not particularly limited to the example of FIG. 4.

One functional block may be constituted by hardware alone, may be constituted by software alone, or may be constituted by a combination thereof.

The functional configuration in the present embodiment and the modification examples is achieved by processors that execute arithmetic processes. The processors capable of being used in the present embodiment and the modification examples includes various processing devices such as single processors, multiprocessors, and multicore processors. In addition, a combination of these various processing devices and a processing circuit such as an application specific integrated circuit (ASIC) or a field-programmable gate array (FPGA) is included.

When the series of processes are executed by software, a program constituting the software is installed on a computer from a network or a recording medium.

The computer may be a computer incorporated in dedicated hardware. The computer may be a computer capable of executing various functions by installing various programs, for example, a general-purpose personal computer.

The recording medium including such a program is constituted by the removable medium 51 of FIG. 2 distributed separately from a device main body in order to provide the program to the user, and is also constituted by a recording medium provided to the user in a state of being incorporated in the device main body in advance. The removable medium 51 is, for example, a magnetic disk (including a floppy disk), an optical disk, or a magneto-optical disk. The optical disk is, for example, a compact disk-read only memory (CD-ROM), a digital versatile disk (DVD), or a Blu-ray (registered trademark) disc. The magneto-optical disk is a mini-disk (MD). The recording medium provided to the user in a state of being installed in the device main body in advance is, for example, a semiconductor memory included in the first ROM 12 and the second ROM 22 of FIG. 2 or the first memory 14 or the second memory 24 of FIG. 2 in which the program is recorded.

In the present specification, the program recorded by the recording medium includes the processes performed in a sequence of time in this order and the processes performed in parallel or individually even when the processes are not necessarily performed in a sequence of time.

What is claimed is:

1. An electronic device comprising:
   a sensor;
   a first processor; and
   a second processor;
   wherein:
   the second processor executes a process to function as a measurement unit that measures cumulative information based on an output of the sensor and outputs a measurement value of the cumulative information;
   the first processor acquires the measurement value of the cumulative information output by the measurement unit, and manages first information related to the cumulative information, the first information including the measurement value of the cumulative information output by the measurement unit, a first correction value for updating a first cumulative value of the cumulative information, and the first cumulative value of the cumulative information, wherein the first cumulative value is calculated based on the measurement value and the first correction value;
   the second processor acquires the measurement value of the cumulative information, and manages second information related to the cumulative information, the second information including the measurement value of the cumulative information, and a second cumulative value of the cumulative information, wherein the second cumulative value is calculated based on the measurement value;
   in a case in which an operating state of the first processor is a stopped state, only the second processor acquires the measurement value of the cumulative information and updates the second information based on the acquired measurement value, while the first processor which is in the stopped state does not acquire the measurement value output by the measurement unit or update the first information; and
   in a case in which the operating state of the first processor transitions from the stopped state to an activation state, the second processor outputs the second cumulative value to the first processor, and the first processor sets a value of the first correction value to the second cumulative value outputted by the second processor and updates the first cumulative value based on the first correction value and a newly acquired measurement value output by the measurement unit after the second processor outputs the second cumulative value.

2. The electronic device according to claim 1, wherein the first processor performs control for displaying the first cumulative value on a first display corresponding to the first processor, and the second processor performs control for displaying the second cumulative value on a second display corresponding to the second processor.

3. The electronic device according to claim 1, wherein:
   the sensor is connected to the second processor, and transmits the output thereof to the second processor,
   the second processor, functioning as the measurement unit, measures the cumulative information based on the output of the sensor transmitted thereto from the sensor and thereby acquires the measurement value of the cumulative information, and
   the first processor acquires the measurement value of the cumulative information output from the second processor functioning as the measurement unit.

4. The electronic device according to claim 1, wherein an operating system functioning in the first processor performs a process for resetting the measurement value according to switching of the operating state of the first processor, and
   at least any one of the first processor and the second processor continues the management of the corresponding one of the first information and the second information by correcting the corresponding one of the first cumulative value and the second cumulative value based on the measurement value reset by the operating system.

5. The electronic device according to claim 1, wherein the cumulative information includes at least any one of a number of steps, a heart rate, and calorie consumption.

6. The electronic device according to claim 1, wherein the cumulative information is cumulated according to a usage status of a user.

7. An information processing method comprising:
outputting, by a sensor, information;
measuring, by a second processor functioning as a measurement unit, cumulative information based on the information output by sensor, and outputting, by the measurement unit, a measurement value of the cumulative information;
acquiring, by a first processor, the measurement value of the cumulative information output by the measurement unit, and managing, by the first processor, first information related to the cumulative information, the first information including the measurement value of the cumulative information output by the measurement unit, a first correction value for updating a first cumulative value of the cumulative information, and the first cumulative value of the cumulative information, wherein the first cumulative value is calculated based on the measurement value and the first correction value; and
acquiring, by the second processor, the measurement value of the cumulative information, and managing, by the second processor, second information related to the cumulative information, the second information including the measurement value of the cumulative information, and a second cumulative value of the cumulative information, wherein the second cumulative value is calculated based on the measurement value,
wherein:
in a case in which an operating state of the first processor is a stopped state, only the second processor acquires the measurement value of the cumulative information and updates the second information based on the acquired measurement value, while the first processor which is in the stopped state does not acquire the measurement value output by the measurement unit or update the first information; and
in a case in which the operating state of the first processor transitions from the stopped state to an activation state, the second processor outputs the second cumulative value to the first processor, and the first processor sets a value of the first correction value to the second cumulative value outputted by the second processor and updates the first cumulative value based on the first correction value and a newly acquired measurement value output by the measurement unit after the second processor outputs the second cumulative value.

8. A non-transitory computer-readable recording medium storing an information processing program that is executable by a computer including a first processor and a second processor, the program being executable by the computer to control the computer to perform functions comprising:
acquiring and outputting information by a sensor;
measuring, by the second processor functioning as a measurement unit, cumulative information based on the information output by sensor, and outputting, by the measurement unit, a measurement value of the cumulative information;
acquiring, by the first processor, the measurement value of the cumulative information output by the measurement unit, and managing, by the first processor, first information related to the cumulative information, the first information including the measurement value of the cumulative information output by the measurement unit, a first correction value for updating a first cumulative value of the cumulative information, and the first cumulative value of the cumulative information, wherein the first cumulative value is calculated based on the measurement value and the first correction value; and
acquiring, by a second processor, the measurement value of the cumulative information, and managing, by the second processor, second information related to the cumulative information, the second information including the measurement value of the cumulative information, and a second cumulative value of the cumulative information, wherein the second cumulative value is calculated based on the measurement value,
wherein:
in a case in which an operating state of the first processor is a stopped state, only the second processor acquires the measurement value of the cumulative information and updates the second information based on the acquired measurement value, while the first processor which is in the stopped state does not acquire the measurement value output by the measurement unit or update the first information; and
in a case in which the operating state of the first processor transitions from the stopped state to an activation state, the second processor outputs the second cumulative value to the first processor, and the first processor sets a value of the first correction value to the second cumulative value outputted by the second processor and updates the first cumulative value based on the first correction value and a newly acquired measurement value output by the measurement unit after the second processor outputs the second cumulative value.

9. The electronic device according to claim 1, wherein in a case in which the operating state of the first processor is the activation state, both the first processor and the second processor acquire the measurement value of the cumulative information, respectively, and both the first processor and the second processor update and manage the first information and the second information, respectively, based on the acquired measurement value.

10. The electronic device according to claim 9,
wherein the second processor manages the second information which further includes a second correction value for updating the second cumulative value, wherein the second cumulative value of the cumulative information is calculated based on the measurement value and the second correction value,
wherein in a case in which the operating state of the first processor transitions from the activation state to the stopped state, the first processor outputs the first correction value to the second processor, and the second processor sets a value of the second correction value to the first correction value outputted by the first processor, and updates the second cumulative value based on the second correction value and the last acquired measurement value.

11. The electronic device according to claim 10, wherein, after the transition of the first processor from the activation state to the stopped state and after the second cumulative value has been updated, the second processor sets the value of the second correction value to the second cumulative value, and newly updates the second cumulative value according to the second correction value and a newly acquired measurement value.

12. The information processing method according to claim 7, wherein in a case in which the operating state of the first processor is the activation state, both the first processor and the second processor acquire the measurement value of the cumulative information, respectively, and both the first processor and the second processor update and manage the first information and the second information, respectively, based on the acquired measurement value.

13. The information processing method according to claim 12,
wherein the second processor manages the second information which further includes a second correction value for updating the second cumulative value, wherein the second cumulative value of the cumulative information is calculated based on the measurement value and the second correction value,
wherein in a case in which the operating state of the first processor transitions from the activation state to the stopped state, the first processor outputs the first correction value to the second processor, and the second processor sets a value of the second correction value to the first correction value outputted by the first processor, and updates the second cumulative value based on the second correction value and the last acquired measurement value.

14. The information processing method according to claim 13, wherein, after the transition of the first processor from the activation state to the stopped state and after the second cumulative value has been updated, the second processor sets the value of the second correction value to the second cumulative value, and newly updates the second cumulative value according to the second correction value and a newly acquired measurement value.

15. The non-transitory computer-readable recording medium according to claim 8, wherein in a case in which the operating state of the first processor is the activation state, both the first processor and the second processor acquire the measurement value of the cumulative information, respectively, and both the first processor and the second processor update and manage the first information and the second information, respectively, based on the acquired measurement value.

16. The non-transitory computer-readable recording medium according to claim 15,
wherein the second processor manages the second information which further includes a second correction value for updating the second cumulative value, wherein the second cumulative value of the cumulative information is calculated based on the measurement value and the second correction value,
wherein in a case in which the operating state of the first processor transitions from the activation state to the stopped state, the first processor outputs the first correction value to the second processor, and the second processor sets a value of the second correction value to the first correction value outputted by the first processor, and updates the second cumulative value based on the second correction value and the last acquired measurement value.

17. The non-transitory computer-readable recording medium according to claim 16, wherein, after the transition of the first processor from the activation state to the stopped state and after the second cumulative value has been updated, the second processor sets the value of the second correction value to the second cumulative value, and newly updates the second cumulative value according to the second correction value and a newly acquired measurement value.

* * * * *